Feb. 28, 1961
C. L. EASTBURG
2,973,230
VENT FITTING FOR BEARING STRUCTURES AND THE LIKE
Filed July 25, 1957
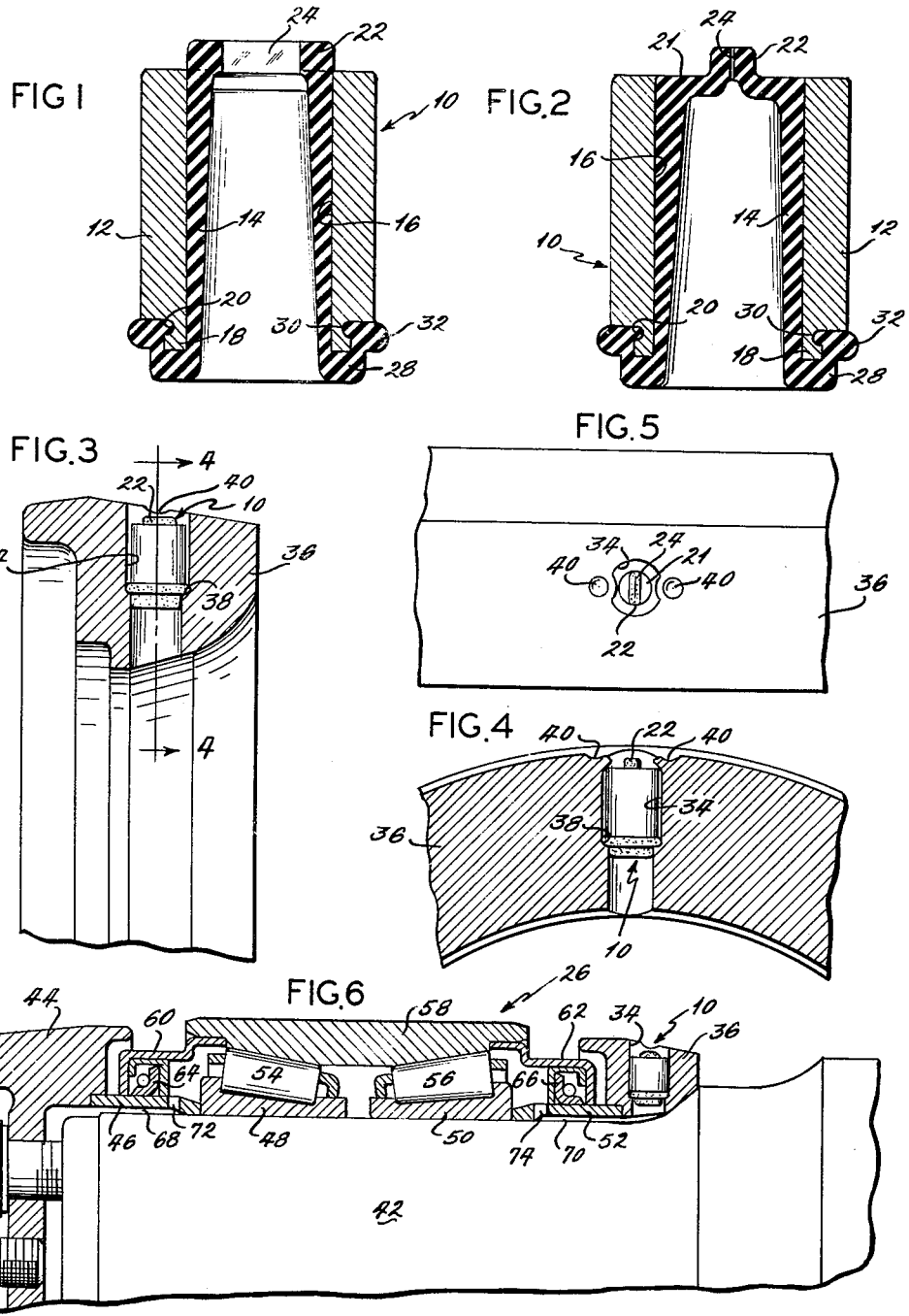
INVENTOR:
CLIFFORD L. EASTBURG
By Gravely, Lieder, Woodruff and Wills
ATTORNEYS.

United States Patent Office 2,973,230
Patented Feb. 28, 1961

2,973,230

VENT FITTING FOR BEARING STRUCTURES AND THE LIKE

Clifford L. Eastburg, Canton, Ohio, assignor to The Timken Roller Bearing Company, Canton, Ohio, a corporation of Ohio Filed July 25, 1957, Ser. No. 674,109

6 Claims. (Cl. 308—187)

The present invention relates generally to bearing structures and more particularly to a fitting containing vent means for relieving internal pressures in bearing structures and the like.

In the past various devices have been contrived to relieve internal pressures that develop in bearing structures and the like. These known devices have been relatively complicated and expensive to construct and install, have been difficult to adjust, and have not provided relief over a wide range of internal pressures. For these and other reasons the known devices have been unsatisfactory. The present vent construction overcomes the undesirable characteristics of the known devices and has for its principal object to provide an inexpensive, easy to install relief vent for use on bearing structures and the like which employs a minimum number of moving parts and which provides relief over a wide range of internal pressures.

Another object is to provide a vent fitting for bearing structures and the like that cannot accidentally open to admit foreign matter.

Another object is to provide a vent fitting that can be sealably mounted in a bearing or like structure without requiring separate mounting members.

Still another object of the invention is to provide a pressure relief fitting for use on bearing structures and the like which operates at all times to relieve internal bearing pressures regardless of the magnitude of such pressures and thereby eliminates the possibility of undesirable pressure buildup.

Briefly, the present relief vent fitting, which is adapted to be installed adjacent to a shoulder in an opening into a bearing structure or the like, comprises a resilient cup-shaped member mounted in a hollow sleeve, said resilient member having an end wall with a normally-closed opening or slit formed therein which end wall responds to internal pressures in the bearing structure greater than the external pressure by deforming the normally-closed opening into an open condition to provide gas or fluid flow communication therethrough, a marginal flange formed on the open end of the resilient member including means thereon for sealing the resilient member to the hollow sleeve and to the shouldered opening in the bearing structure, and means formed in the bearing structure adjacent the shouldered opening to prevent the fitting from coming loose from its sealed position.

Other objects and advantages of the present invention will become apparent after considering the following detailed specification in conjunction with the accompanying drawing, wherein:

Fig. 1 is an enlarged cross-sectional elevational view taken through the center of a vent fitting constructed according to the teachings of the present invention, Fig. 2 is an enlarged cross-sectional elevational view taken through the center of the same vent fitting at right angles to the view in Fig. 1, Fig. 3 is a fragmentary sectional view through the backing ring of a bearing structure showing the present vent fitting mounted in a passage therethrough, Fig. 4 is a fragmentary cross-sectional view through the same backing ring taken along line 4—4 in Fig. 3, Fig. 5 is a fragmentary top plan view of the backing ring shown in Figs. 3 and 4, and Fig. 6 is a fragmentary cross-sectional view of a typical bearing assembly employing a vent fitting constructed according to the teachings of this invention.

Referring to the drawing more particularly by reference numbers, the number 10 refers to a vent fitting constructed according to the teachings of this invention. The fitting 10 is constructed of two members, a sleeve 12 and a resilient member 14. The sleeve 12 is preferably formed of metal, or suitable material, and is shown having an annular shape with a central passage 16 therethrough. The sleeve 12 also has a projecting lip or axially extending portion 18 with an external groove 20 formed therein.

The resilient member 14 is cup-shaped and is positioned in the sleeve 12 with its closed end adjacent to one end of the sleeve passage 16 and its open end extending from the opposite end thereof. The side wall of the member 14 is shown tapered becoming thicker at the closed end thereof and the closed end wall 21 of the member 14 is circular (Fig. 5) or such other shape as will conform to the shape of the passage 16. The wall 21 has a projecting portion 22 which is formed on a diameter thereof. The portion 22 has a narrow diametral opening or slit 24 formed through it, and in normal operating condition with little or no pressure across the closed end wall 21 of the member 14, the surfaces of the opening or slit 24 are in engagement and the opening 24 is closed. Only when the pressure inside the member 14 (which corresponds to the internal pressure in a bearing assembly) exceeds the pressure on the outside, as when the internal pressure in bearing assembly 26 (Fig. 6) exceeds the external or atmospheric pressure, will the surfaces of the slit 24 separate to reduce or eliminate the pressure difference.

The open end of the resilient member 14 is formed with an annular flange 28 part of which extends around and outside of the lip portion 18. The flange 28 has an inner beaded portion 30 which co-operatively and sealably engages the groove 20 to seal the members 12 and 14 together, and an outer beaded portion 32 which projects outwardly beyond the sleeve 12 and sealably engages the surface of passage 34 in which the fitting 10 is mounted.

In the assembled condition of the fitting 10, as described hereinabove, the fitting 10 is installed (by sliding or ramming it) in the passage or bore 34 in a bearing member such as in the backing ring 36 (Figs. 3–6). It is anticipated, however, that the fitting 10 could be installed in members other than the backing ring 36, and furthermore, that it could be installed on equipment rather than bearing structures without departing from the spirit and scope of this invention. The bore 34 has an outer portion with a diameter that is large enough to receive the fitting 10 when the outer beaded portion 32 thereof is compressed inwardly into engagement therewith. The outer portion of the bore 34 terminates at a shoulder 38 (which could be a flange instead) and a smaller diameter portion of the bore 34 extends the rest of the way through the backing ring 36. When the fitting 10 is installed in the bore 34, the flanged portion 28 of the member 14 sealably engages wall of the bore 34 and the shoulder 38. To complete the installation and prevent the fitting 10 from coming loose from the bore 34, the same is staked by forming depressions 40 (Figs. 4 and 5) in the backing ring 36 adjacent to the mouth of the bore 34.

Fig. 6 shows a portion of a sealed bearing assembly 26 which is provided with a relief vent fitting 10 constructed according to the teachings of this invention. The assembly 26 is mounted on journal 42 and includes an end cap 44 bolted to the end of the journal 42, and annular member 46 sealably engaged with the end cap 44 and mounted on the journal 42, inner race members 48 and 50, another annular member 52, and the backing ring 36 which sealably engages the members 52 and the journal 42. Rings of anti-friction rollers 54 and 56 are positioned on the inner races 48 and 50 respectively, and an outer race member 58 co-operatively engages the rollers 54 and 56 and is sealably engaged at its ends with the annular members 46 and 52 by members 60 and 62 and seals 64 and 66 respectively.

The annular members 46 and 52 have annular grooves 68 and 70 and connecting radial passages 72 and 74 which provide communication through the bearing assembly 26 from the end cap 44 to the fitting 10.

If during operation of the bearing assembly 26 (or any other bearing assembly or construction equipped with a vent fitting similar to fitting 10) internal pressure should develop due to high temperatures or for any other reason, the surfaces of the slit 24 in the member 14 will separate creating an opening therethrough and relieving the pressure without allowing the pressure to build up and cause damage or faulty operation.

Thus it is apparent that there has been provided a vent fitting for relieving internal pressure in bearing structures and the like which fulfills all of the objects and advantages sought therefor. It is to be understood, however, that the foregoing description and accompanying drawing have been presented only by way of illustration and example and that the present device could be constructed in many other shapes and forms and used on many devices other than the bearing structure shown where the relief of pressure is desired without departing from the spirit and scope thereof. All such changes, alterations, and modifications of the present device, including different applications therefor, which will be apparent to those skilled in the art and which do not depart from the spirit and scope of this invention, are contemplated as being within the scope of this invention which is limited only by the claims which follow.

What I claim is:

1. A sealed bearing structure having a housing with a passage therethrough, means positioned inside said passage to maintain the sealed condition and to allow the structure to breathe, said means including a fitting comprising a relatively unyielding tubular support member having a diameter smaller than the diameter of the passage in which it is positioned to from a space therebetween, and a resilient cup-shaped member having a flange formed on one open end thereof and a passage closing wall formed on the other end, said passage closing wall having a pair of lip members thereon and a normally-closed slit formed between said lip members, said lip members opening in response to predetermined pressure differences, said cup-shaped member being positioned in the support member such that the flange thereon sealably cooperates with one end of the support member and extends radially outwardly therefrom to embrace said one end, said fitting being slidably installed in the passage in said bearing structure such that the flange is sealably compressed in the space between the support member and the passage, and means deforming the passage to prevent removal of the fitting therefrom.

2. The sealed bearing structure defined in claim 1 wherein said passage deforming means includes means deforming the passage adjacent one end thereof to prevent removal of the fitting therefrom.

3. The fitting defined in claim 1 wherein the passage has a shoulder therein and the flanged portion of the cup-shaped member is moved into engagement therewith when the fitting is installed.

4. A sealed bearing assembly for a vehicle axle and with provision for breathing during temperature increases while in service, said assembly including inner and outer bearing races on the vehicle axle, a backing member on the vehicle axle for said races, a cap member also on the vehicle axle opposite said backing member to retain said races in position, means adjacent said members adapted to seal said bearing races from ingress of dirt and foreign matter, a passage in one of said members, and a bearing breather disposed in said passage to allow pressure build-up in the assembly upon rise of temperature to be vented to the exterior, said breather comprising a tubular plug having an outside diameter substantially smaller than the diameter of the passage to form a space therebetween, and a flexible body sealed to said plug between the plug and the passage, said flexible body being supported by said plug and having a relatively flat wall which closes the tubular plug and which is slitted to open outwardly upon temperature build-up in the bearing assembly.

5. A fitting adapted to be installed entirely inside a passage leading into a bearing assembly or the like for relieving internal pressure comprising a fitting of unitary construction including a tubular sleeve of relatively hard material and having an outside diameter substantially smaller in diameter than the passage to provide space therebetween when installed, and a resilient cup-shaped member positioned in the tubular sleeve, said cup-shaped member having a side wall portion in abutment with the tubular sleeve and an end wall portion closing one end thereof, said end wall portion being relatively flat over a substantial portion thereof and having a normally closed slit formed therein, said end wall portion adapted to response to pressure differences on opposite sides thereof by yielding to open the slit and provide limited air flow passage therethrough, said cup-shaped member also having a flanged portion on one end thereof which extends on the inside and outside of one end of the sleeve and embraces the outer periphery of said one end of the sleeve, the outside periphery of the flanged portion being adapted to be compressed between the sleeve and the passage in the bearing assembly when the fitting is installed in the passage.

6. A fitting adapted to be installed inside a passage into a bearing assembly or like structure for relieving internal pressures comprising a fitting of unitary construction adapted to be slip fitted into the passage for installation inside said passage, said fitting including a relatively hard tubular sleeve having an outside diameter substantially smaller than the diameter of the passage to provide space therebetween when installed, and a resilient cup-shaped member positioned in said tubular sleeve, said cup-shaped member having a side wall portion abutting said tubular sleeve and a relatively flat end wall portion with lips forming a normally-closed slit therethrough, said cup-shaped member also having a flanged portion at the opopsite end thereof from the end wall portion which extends on the inside and outside of one end of the sleeve and embraces the outer periphery of said one end of said sleeve, said fitting being adapted to be slip fitted into the passage in a bearing assembly or like structure whereby the outside periphery of the flanged portion is compressed between the sleeve and the passage to seal therebetween.

(References on following page)

References Cited in the file of this patent

UNITED STATES PATENTS

| | | | |
|---|---|---|---|
| Re. 682 | Peale | Apr. 5, 1859 |
| 615,751 | Sands | Dec. 13, 1898 |
| 810,502 | Nolan | Jan. 23, 1906 |
| 2,283,871 | Norelius | May 9, 1942 |
| 2,576,192 | Poznik | Nov. 27, 1951 |
| 2,610,097 | Shelden | Sept. 9, 1952 |
| 2,611,450 | Kalikow | Sept. 23, 1952 |
| 2,662,724 | Kravagna | Dec. 15, 1953 |
| 2,720,431 | Browne et al. | Oct. 11, 1955 |
| 2,770,507 | Ehnts | Nov. 13, 1956 |
| 2,830,832 | Moorman et al. | Apr. 15, 1958 |
| 2,851,315 | Zavoda | Sept. 9, 1958 |
| 2,922,437 | Rippingille | Jan. 26, 1960 |

FOREIGN PATENTS

| | | |
|---|---|---|
| 155,590 | Australia | Mar. 9, 1954 |